Nov. 6, 1934.  M. P. BROWNE  1,979,860
ADJUSTABLE SEAT FOR VEHICLES
Filed Feb. 8, 1932  2 Sheets-Sheet 1
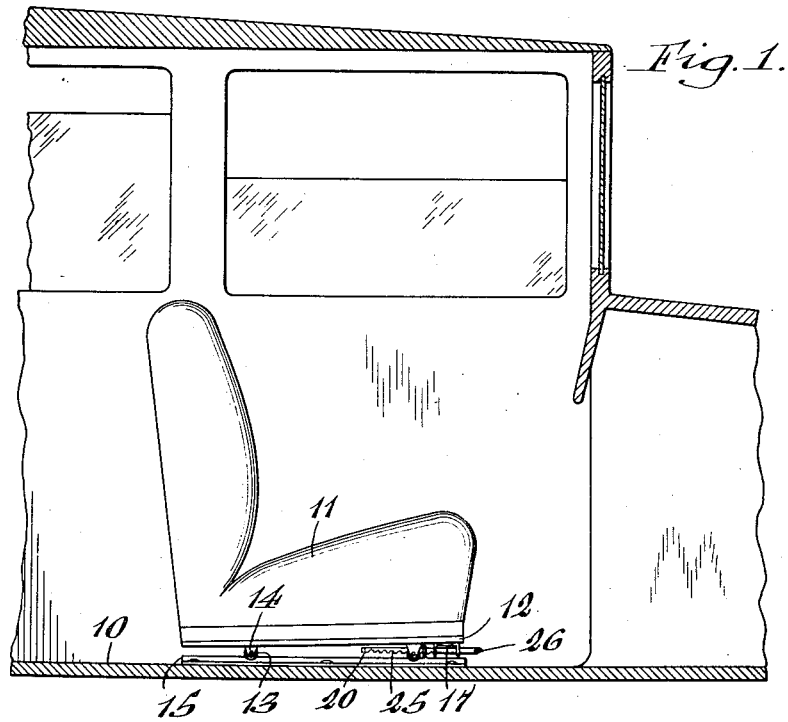
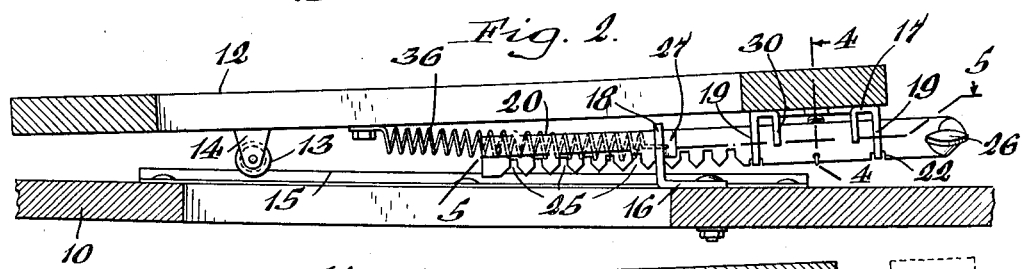
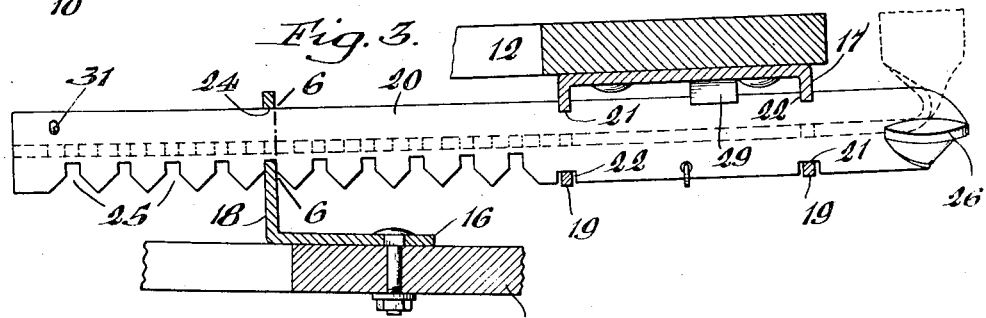
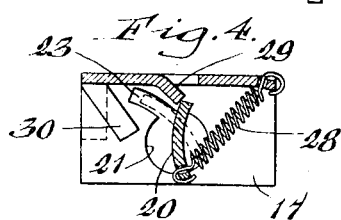

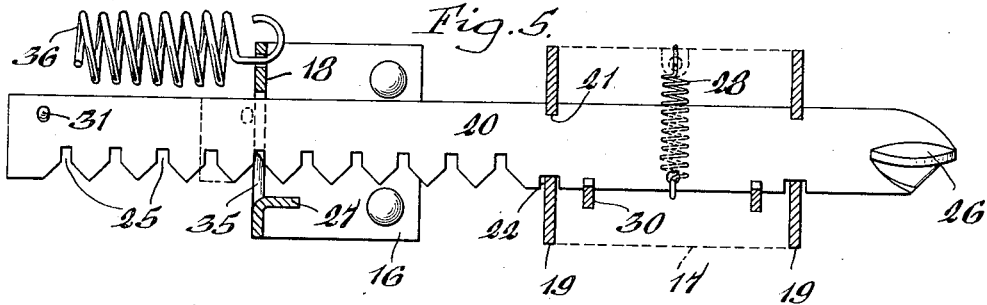
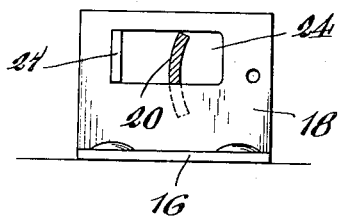
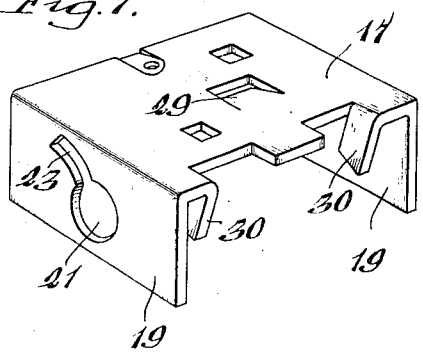
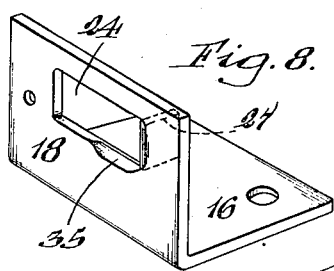
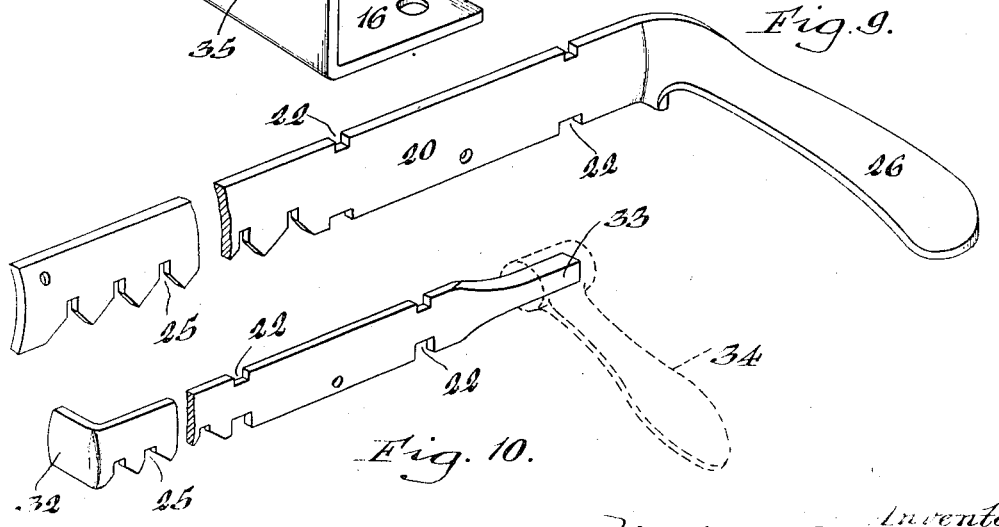

Patented Nov. 6, 1934

1,979,860

UNITED STATES PATENT OFFICE 1,979,860

ADJUSTABLE SEAT FOR VEHICLES

Montague P. Browne, Buffalo, N. Y.

Application February 8, 1932, Serial No. 591,627

10 Claims. (Cl. 155—14)

This invention relates generally to automobile seats and more particularly to an adjustable control device therefor to adapt the seat to be shifted to a position to suit the convenience of the driver in operating the car, as well as to permit the movement of the seat to a position to facilitate the egress and ingress of passengers to and from the rear seat of the automobile, such for example, as a vehicle of the coach or two-door type.

One of the objects of the invention is the provision of an adjustable sliding mechanism of this character which is simple, compact and inexpensive in construction, and whose parts are so designed and organized as to effect its ready adjustment and permit the gliding movement of the seat without its occupant leaving the same.

A further object of the invention is to provide a seat control which is composed of few parts, which can be readily installed, and which is positive and reliable in operation.

Other features of the invention reside in the construction and arrangement of parts hereinafter described and particularly pointed out in the appended claims.

In the accompanying drawings:—

Figure 1 is a fragmentary longitudinal section of an automobile showing my invention applied thereto. Figure 2 is an enlarged side elevation of my seat control mechanism, the floor and seat frame of the vehicle being shown in section. Figure 3 is a fragmentary vertical section, on a further enlarged scale, of the operating parts of the device. Figure 4 is a transverse section taken on line 4—4, Figure 2. Figure 5 is an enlarged horizontal section taken in the plane of line 5—5, Figure 2. Figure 6 is a transverse section taken on line 6—6, Figure 3. Figures 7 and 8 are perspective views of the seat-frame bracket and the floor bracket of my seat control mechanism. Figure 9 is a perspective view of the control element or latch bar of the device. Figure 10 is a perspective view of a slightly modified form of that bar.

Referring now to the drawings, 10 indicates the floor of an automobile and 11 the front seat thereof having the customary base frame 12. At its opposite sides this seat frame is preferably slidingly supported to move lengthwise of the vehicle on rollers 13 journaled in suitable brackets 14 secured to the underside of the seat-frame and engaging tracks 15 secured to the floor 10 beneath the seat.

Disposed lengthwise of the car and by preference substantially centrally beneath the seat is the control mechanism therefor which is preferably constructed as follows:

Mounted on the floor and seat frame of the vehicle for relative longitudinal movement are plates or brackets 16 and 17, respectively, the bracket 16 being bolted or otherwise secured to the floor and terminating at its rear edge in an upstanding flange 18. The seat-bracket 17 is mounted on the underside of the front portion of the seat-frame by bolts or other fasteners and terminates at its front and rear edges in depending flanges 19, 19, the seat-bracket being disposed forwardly of the floor-bracket flange 18 in all adjustable positions of the seat, and the flanges of said brackets being disposed in substantially the same horizontal plane.

For the purpose of adjusting and latching the sliding seat in any one of a plurality of positions, I provide a controlling element disposed lengthwise of the vehicle and supported in the seat-bracket 17 and adapted for adjustable interlocking engagement with the floor-bracket 16. By preference this controlling element consists of a horizontally-disposed latch bar 20 journaled adjacent its front end in openings 21 formed in the flanges 19 of the seat-bracket, those portions of the latch bar engaging said openings having notches 22 at their upper and lower edges to interlock with the marginal edges of the bracket-openings and thereby permit rotary movement of the latch bar in their openings but prevent longitudinal movement of the latch bar relative to the seat-bracket. From this construction, as seen in Figure 3, it will be noted that the width of the latch bar is greater than that of the diameter of the bearing openings 21, and to facilitate the assembling of the bar in its supporting bracket, the flanges 19 of the latter have alining notches 23 radiating from said openings and into which the adjoining edge of the latch bar is adapted to extend during the insertion or removal of the latch bar to and from the seat-bracket. These notches 23, as seen in Figure 4, are positioned out of the normal operative range of turning movement of the latch bar so that there is no danger of the bar registering with these notches at such time.

The rear portion of the latch bar extends through a transverse slot or opening 24 formed in the flange 18 of the floor-plate 16, and as the seat is shifted lengthwise of the vehicle at the will of its occupant to a desired adjusted position, this latch bar is adapted to interlock with such flange and positively hold the seat in such position. For this purpose, one of the longitudinal edges of the latch bar is provided with a row of locking notches 25 which are adapted to releasably interlock with an opposing edge of the slot 24, as seen in Figure 3, to hold the seat in the desired adjusted position. The vertical dimension of the slot 24 is less than that of the width of the latch bar and its transverse dimension is at least equal to but preferably somewhat greater than the width of the latch bar to permit the free passage of the latter through the slot during the sliding movement of the seat to a desired adjusted position. In other words, when the latch bar is in the position shown by full lines in Figure 3, it is interlocked with the floor bracket against longitudinal movement, while when it is in the dotted line position shown in Figure 3 and the full line position shown in Figure 5, the same is free to move lengthwise in the slot 24, the bar being turned approximately a quarter of a turn in assuming either of these positions. For convenience of operating it, the latch bar has a handle 26 at its front end, which may, if desired, be integrally formed with the bar, as shown in Figure 9. To eliminate any possibility of the notched edge of the bar becoming accidentally interlocked with the adjoining vertical edge of the bracket slot 24, when the latch bar is turned to a horizontal position for permitting the sliding of the seat to a predetermined position, I provide that edge of the slot with a forwardly-bent flange 27 which functions to form a broadened surface over which the notched edge of the bar rides, such flange being greater in width than the notches in the bar. In practice, said flange 27 may be formed from a portion of the stock removed for forming the slot 24. This flange also functions as a back stop against which the rear flange 19 of the seat-bearing bracket 17 is adapted to abut to limit the rearward movement of the seat. In order to normally hold the latch bar 20 in a set adjusted position and accidentally prevent its turning or displacement out of a latched position, a spring 28 is connected at one end thereto and at its other end to the seat-frame bracket 17, the spring tending to turn the latch bar in a direction to bring its notched-edge into locking engagement with the floor-bracket 16. A stop 29 applied to the seat bracket is disposed in the path of turning movement of the latch bar and predetermines the position of the latter in its substantially upright or latched position seen in Figure 4, the spring 28 urging the bar against the stop. Also applied to the seat-bracket are stops 30 which are disposed in the path of rotary movement of the bar in the opposite direction and predetermine positioning the same in a substantially horizontal unlatched position to permit shifting the seat to a desired adjusted position. Both stops 29 and 30 may be conveniently formed integral with the bracket by stamping the same therefrom, as shown in Figures 4 and 7. In assembling the latch bar in the seat-bracket, the stop lugs 30 assume the position shown by dotted lines in Figure 4, in which position they permit the free insertion of the bar through the bearing openings 21 and the alining insertion-notches 23. After the mounting of the latch bar in its bracket, the stop lugs 30 are then bent to the position shown by full lines in Figures 4 and 7, in which position they positively prevent the latch bar being turned into registration with the insertion-notches 23.

For the purpose of strengthening the latch bar 20, it is preferably curved or arcuate in cross section, as seen in Figure 4, and it is provided at its rear end with a stop pin 31 which is adapted to abut against the flange 18 of the floor plate 16 in the extreme forward movement of the seat. If desired, however, such a stop may be made in the form of a laterally-bent flange 32, as seen in Figure 10, for accomplishing the same purpose. In this case, the stop flange is bent over at substantially right angles to the latch bar after the latter has been assembled in the seat-bracket 17. In this modified form of the latch bar its front end terminates in a substantially square shank 33 for receiving a separate handle 34.

The lower edge of the transverse slot 24 of the floor-bracket 16 is preferably beveled or chamfered, as seen at 35 in Figure 8, so as to permit the ready interlocking of the latch bar with such bracket, when said bar is turned to its latched position.

To facilitate the forward gliding movement of the seat, I preferably employ an energy-storing element, which may consist of a spring 36 connected at one end to the floor plate 16 and at its other end to the seat-frame 12.

Briefly stated, the operation of this sliding seat control is as follows:—

The movement of the seat forward or backward to a position to suit its occupant or to permit the ingress and egress of passengers to and from the rear seat of the vehicle may be accomplished by the occupant while sitting in the seat or while standing beside it. Upon turning the latch bar 20 a quarter of a turn from the full line to the dotted line position shown in Figure 3, the same is unlatched from the bracket-flange 18, thereby permitting the seat to slide forwardly automatically by the energy-storing spring 36. When the desired position of the seat is reached, the latch bar is returned to its normally latched position by the spring 28, bringing the alining notch 25 thereof into latched engagement with the bracket-flange 18. In effecting a rearward adjustment of the seat, should it be occupied, the occupant simply uses foot-pressure to shift the seat rearwardly to the position desired and then latch it in such position.

I claim as my invention:—

1. A seat control for automobiles and the like, comprising a member adapted for attachment to the seat and including longitudinally-spaced elements having alining bearing openings therein, a revolvable latch bar having its front portion journaled and longitudinally-supported in said openings and held against endwise movement therein, the remaining portion of said bar extending rearwardly beyond said member and having a row of locking notches in one of its edges, a second member adapted for attachment to the vehicle floor and having an opening therein, the notched portion of said bar extending through said opening to interlock with the marginal edge thereof when the bar is turned to a latched position and to freely pass through said opening when the bar is turned to a released position to permit sliding of the seat, and means applied to one of said members for limiting the turning movement of the latch bar to its latched and unlatched positions, respectively.

2. A seat control for automobiles and the like, comprising a member adapted for attachment to the seat and including longitudinally-spaced elements having alining bearing openings therein, a revolvable latch bar having its front portion journaled and longitudinally-supported in said openings and held against endwise movement therein, the rear portion of said bar extending beyond said member and having a row of locking notches in one of its edges, a second member adapted for attachment to the vehicle floor and having an opening therein for receiving the notched portion of said bar, said opening being longitudinally in line with said bearing openings and of a width to permit the longitudinal movement of the bar therethrough in its unlatched position, the notched bar being arranged to interlock with the marginal edge of said opening in the latched position thereof, means applied to one of said members for limiting the turning movement of the latch bar to its latched and unlatched positions, respectively, and means for yieldingly resisting turning of said bar out of its latched position.

3. A seat control for automobiles and the like, comprising a member adapted for attachment to the seat and having longitudinally alined bearing openings therein, a revolvable latch bar having its front portion journaled in said openings and held against endwise movement therein, the rear portion of said bar extending beyond said member and having a row of locking notches in one of its edges, a second member adapted for attachment to the vehicle floor and having an opening therein through which the notched portion of the bar extends, one or another of said bar-notches being arranged to interlock with the marginal edge of said opening in the latched position of the bar, said bar being adapted to freely pass longitudinally through said opening in the unlatched position thereof to permit sliding of the seat, and stop lugs applied to said seat-bearing member and projecting into the path of turning movement of the latch bar to predetermine its respective positions.

4. A control device for sliding vehicle seats comprising a seat-bearing bracket having flanges containing alining openings, a floor-bracket having a flange containing an opening substantially in line with the seat-bracket openings, and a revolvable latch bar having its front portion journaled in said seat-bracket openings against endwise movement and having its rear portion engaging said floor-bracket opening and movable longitudinally therethrough in the unlatched position of the bar, the rear portion of said bar having a row of locking notches therein arranged to interlock with the marginal edge of the floor-bracket opening in the latched position of the bar, the opening in the floor-bracket having one dimension substantially equal to the overall width of the bar and its other dimension substantially equal to the width of the bar between the bottom of its notches and its unnotched edge.

5. A control device for sliding vehicle seats, comprising a seat-bearing bracket having flanges containing alining openings and notches radiating therefrom, a floor-bracket having a flange containing an opening substantially in line with the seat-bracket openings, and a revolvable latch bar having its front portion journaled in said seat-bracket openings and having its rear portion engaging said floor-bracket opening for movement lengthwise therethrough in the unlatched position of the bar, the rear portion of said bar having a row of locking notches therein arranged to interlock with the marginal edge of the floor-bracket opening in the latched position of the bar, the front portion of the latch bar having a pair of notches in its opposite edges to interlock with the adjoining edges of the seat-bracket openings to prevent endwise displacement of said bar, the latter being insertable into its assembled position in the seat-bracket openings through the radiating notches thereof.

6. A control device for sliding vehicle seats, comprising a seat-bearing bracket, a latch bar mounted on said bracket to turn thereon and having a row of locking notches in one of its longitudinal edges, and a floor bracket having an opening through which the notched portion of said latch bar extends and relative to which it is longitudinally movable in the unlatched position of the bar, one or another of the bar-notches being arranged to interlock with the marginal edge of the floor-bracket opening in the latched position of the bar, said floor-bracket having a lateral projection coextensive with an edge of its opening adjoining the notch-engaging edge thereof and over which the notched edge of the bar passes when rotated to its unlatched position, said lateral projection being greater in width than the bar notches.

7. In a control device for sliding seats, a plate adapted for attachment to the seat and including depending flanges at its front and rear ends having alining openings therein and alining notches radiating from the openings, and a latch bar supported for turning in said flange-openings and having notches in its opposite edges to receive the marginal edges of such openings, said bar being greater in width than the diameter of said openings and being insertable into its assembled position through the openings and their radiating notches.

8. In a control device for sliding seats, a plate adapted for attachment to the seat and including depending flanges at its front and rear ends having alining openings therein and alining notches radiating from the openings, a latch bar supported for turning movement in said flange-openings and having notches in its opposite edges to receive the marginal edges of such openings, said bar being greater in width than the diameter of said openings and being insertable into its assembled position through the openings and their radiating notches, and stop lugs applied to said plate and disposed in the path of turning movement of the latch bar to predetermine its latched and unlatched positions, respectively, said radiating notches and said stop lugs being so disposed relatively to one another as to prevent registration of the latch bar with the radiating notches in the operating turning range of said bar.

9. A control device for sliding vehicle seats comprising a seat-bearing bracket having flanges containing alining openings, a floor-bracket having a flange containing an opening substantially in line with the seat-bracket openings, and a revolvable latch bar journaled at one end in said seat-bracket openings against endwise movement and extending at its other end through said floor-bracket opening, said bar having a handle thereon for turning it and a row of locking notches therein arranged to interlock with the marginal edge of the floor-bracket opening when the bar is turned to its latched position, and to be released therefrom when the bar is turned to its unlatched position to permit a relative movement of the bar through said opening to adjust the seat to a desired position, and a stop applied to the rear end of said bar and adapted to engage the floor-bracket to limit the maximum forward movement of the seat.

10. A seat control for automobiles and the like, comprising a seat-bearing unit and a floor-bearing unit, the seat unit consisting of a bracket adapted for attachment to the underside of the seat, a latch bar disposed lengthwise of the seat and rotatably supported intermediate its ends against endwise movement on said bracket, the front end of said latch bar having a handle thereon and its rear portion projecting beyond said bracket and having a row of locking notches in one of its edges, the floor-bearing unit consisting of a bracket adapted for attachment to the vehicle floor and having an opening therein through which the notched portion of the bar extends, one or another of said notches being adapted to interlock with the marginal edge of the floor-bracket opening when the bar is turned to its latched position to hold the seat in a desired set position, and the bar being free to pass longitudinally through said opening when it is turned to a released position to permit sliding of the seat.

MONTAGUE P. BROWNE.